US012732661B2

(12) United States Patent
Kemp et al.

(10) Patent No.: US 12,732,661 B2
(45) Date of Patent: Sep. 8, 2026

(54) CONTENT FILTER FOR INFORMATION HANDLING SYSTEMS

(71) Applicant: Dell Products L.P., Round Rock, TX (US)

(72) Inventors: Walter Kemp, Georgetown, TX (US); Marcus Daniel Molner, Austin, TX (US); Kai Wang, Shanghai (CN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/929,845

(22) Filed: Oct. 29, 2024

(65) Prior Publication Data

US 2026/0122315 A1 Apr. 30, 2026

(51) Int. Cl.

| | |
|---|---|
| ***H04N 21/4545*** | (2011.01) |
| ***H04L 65/756*** | (2022.01) |
| ***H04N 21/414*** | (2011.01) |
| ***H04N 21/4143*** | (2011.01) |
| ***H04N 21/439*** | (2011.01) |
| ***H04N 21/44*** | (2011.01) |

(52) U.S. Cl.

CPC ....... *H04N 21/4545* (2013.01); *H04L 65/756* (2022.05); *H04N 21/41407* (2013.01); *H04N 21/4143* (2013.01); *H04N 21/4392* (2013.01); *H04N 21/44004* (2013.01)

(58) Field of Classification Search

CPC ......... H04N 21/41407; H04N 21/4143; H04N 21/4392; H04N 21/44004; H04N 21/4545; H04L 65/756

See application file for complete search history.

(56) References Cited

U.S. PATENT DOCUMENTS

| | | | | |
|---|---|---|---|---|
| 5,434,678 | A * | 7/1995 | Abecassis | H04N 21/4542 348/E7.071 |
| 6,112,186 | A * | 8/2000 | Bergh | G06Q 30/02 705/14.66 |
| 7,117,518 | B1 * | 10/2006 | Takahashi | H04N 21/44222 725/86 |
| 7,430,360 | B2 * | 9/2008 | Abecassis | H04N 7/17318 348/E7.071 |
| 8,176,510 | B2 * | 5/2012 | Craner | H04N 21/478 725/39 |
| 8,689,250 | B2 * | 4/2014 | Bhide | H04N 21/6582 725/40 |
| 9,226,027 | B2 * | 12/2015 | Bhide | H04N 21/454 |
| 2005/0086069 | A1 * | 4/2005 | Watson | H04N 21/4755 726/3 |

(Continued)

*Primary Examiner* — Michael B. Pierorazio
(74) *Attorney, Agent, or Firm* — Fogarty LLP

(57) ABSTRACT

Systems and methods are provided for content filtering by an Information Handling System (IHS). A digital media signal is received by the IHS and the digital media signal is decomposed to isolate two or more different types of content, with one or more streams isolated from the signal for each of the different types of content. The streams of each type of content are input to a content filtering model. The content filtering model outputs at least one of: displayed portions of the digital media signal and audible portions of the digital media signal, to be filtered. The digital medial signal is regenerated from one or more streams of content that have been filtered based on the outputs of the content filtering model.

17 Claims, 3 Drawing Sheets

(56) References Cited

U.S. PATENT DOCUMENTS

2006/0110136 A1* 5/2006 Abecassis .............. H04N 21/47 348/E7.071
2007/0124756 A1* 5/2007 Covell .................. G06F 16/635 348/E7.071
2007/0271580 A1* 11/2007 Tischer .................. H04H 60/07 725/35
2008/0155614 A1* 6/2008 Cooper ............ H04N 21/23106 705/26.1
2009/0034426 A1* 2/2009 Luft ................... H04N 21/2407 370/252
2009/0083784 A1* 3/2009 Cormack ............... H04H 60/58 725/25
2009/0133051 A1* 5/2009 Hildreth ........... H04N 21/42204 725/28
2009/0138805 A1* 5/2009 Hildreth ............. H04N 21/4755 715/745
2009/0164655 A1* 6/2009 Pettersson ............... H04L 65/65 709/231
2009/0172757 A1* 7/2009 Aldrey ................... H04N 7/173 725/110
2010/0058400 A1* 3/2010 Nicas ................. H04N 7/17318 725/74
2010/0122293 A1* 5/2010 Craner ................. H04N 21/812 725/40
2010/0131385 A1* 5/2010 Harrang ............. G06Q 30/0631 705/26.1
2010/0250672 A1* 9/2010 Vance .................. G06Q 10/109 709/204
2011/0099572 A1* 4/2011 Craner ................. H04N 21/482 725/25
2011/0154385 A1* 6/2011 Price ....................... G10L 17/00 725/12
2011/0193971 A1* 8/2011 Lin .......................... H04N 7/18 348/207.1
2011/0283189 A1* 11/2011 McCarty ............ H04N 21/4532 715/810
2012/0059845 A1* 3/2012 Covell ............... H04N 21/4394 707/769
2012/0075168 A1* 3/2012 Osterhout ............... G06F 3/017 345/8
2012/0117103 A1* 5/2012 Farrelly .................. H04L 67/10 707/769
2012/0192234 A1* 7/2012 Britt ................... H04N 21/4882 725/98
2012/0324550 A1* 12/2012 Wasilewski ........ H04N 21/4661 726/5
2013/0014136 A1* 1/2013 Bhatia .............. H04N 21/44218 725/9
2013/0254795 A1* 9/2013 Botta ................. H04N 21/4542 725/28
2014/0007150 A1* 1/2014 Bhide .................. H04N 21/266 725/14
2014/0165092 A1* 6/2014 Bhide ................ H04N 21/6543 725/28
2014/0359647 A1* 12/2014 Shoemake ......... H04N 21/6582 725/10
2015/0026708 A1* 1/2015 Ahmed ................ H04N 21/812 725/12
2015/0070516 A1* 3/2015 Shoemake ......... H04N 21/4542 348/207.11
2015/0309687 A1* 10/2015 Herigstad ............ H04N 21/478 715/784
2016/0182597 A1* 6/2016 Yanovsky ............... H04L 65/65 709/219
2016/0323643 A1* 11/2016 Panchaksharaiah ......................... H04N 21/4753
2022/0284884 A1* 9/2022 Tongya ................... G06F 40/35

* cited by examiner

CONTENT FILTER FOR INFORMATION HANDLING SYSTEMS

FIELD

This disclosure relates generally to Information Handling Systems (IHSs), and more specifically, to content filtering for IHSs.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Personal IHSs, such as a laptop or desktop computer, are used to provide users with multimedia outputs in a wide variety of forms. Users may view videos, read text, view images and/or hear audio, in any combination. Such multimedia feeds may thus subject users to a wide variety of content that the user should not and/or does not want to see or hear. A user can manually terminate the multimedia feed, but has few other options for continuing the multimedia session without being subjected to the unwanted content.

SUMMARY

In various embodiments, systems and methods are provided for content filtering by an Information Handling System (IHS). The systems and methods may include: receiving a digital media signal; decomposing the digital media signal to isolate two or more types of content, with one or more streams isolated from the signal for each of the types of content; inputting the one or more streams of each type of content to a content filtering model; outputting, by the content filtering model, at least one of: displayed portions of the digital media signal and audible portions of the digital media signal, to be filtered; and regenerating the digital medial signal from one or more streams of content that have been filtered based on the outputs of the content filtering model.

Some embodiments include launching a virtual environment comprising a multimedia application for output of the regenerated digital media signal. In some embodiments, inputs to the content filtering model further comprise one or more libraries of unwanted exemplar content to be filtered. Some embodiments include modifying the one or more libraries of samples to be filtered in response to feedback from a user of the IHS. In some embodiments, the feedback comprises a user interface request by the user to remove an instance of filtered content. In some embodiments, a first type of content decomposed from the digital media signal comprise audio, and wherein the one more streams of content comprise at least one audio stream. In some embodiments, the content filtering model outputs one or more segments of the audio stream to be replaced. In some embodiments, a second type of content decomposed from the digital media signal comprise text, and wherein the one more streams of content comprise at least one text stream. In some embodiments, the content filtering model outputs one or more portions of text to be redacted. In some embodiments, a third type of content decomposed from the digital media signal comprise images, and wherein the one more streams of content comprise at least one image stream. In some embodiments, the content filtering model outputs one or more images to be redacted. In some embodiments, a fourth type of content decomposed from the digital media signal comprise video, and wherein the one more streams of content comprise at least one video stream. In some embodiments, the content filtering model outputs one or more frames of the video stream to be redacted. In some embodiments, the content filtering model comprises a neural network, wherein the one or more streams of content and the one or more libraries are included as inputs to the neural network. In some embodiments, the one or more streams of content are buffered and provided to input nodes of the neural network that generates outputs that identify content be filtered from each of the respective streams. In some embodiments, the digital media signal is decomposed into a plurality of separate buffers designated for each of the forms of content. In some embodiments, buffers for one of the types of content is input to the content filtering model unsynchronized with buffers for other types of content decomposed from the digital media signal. In some embodiments, the unsynchronized type of content is selected on the basis of being a leading indicator of unwanted content of other types to be filtered.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail with regard to FIG. 1.

Figure 1:
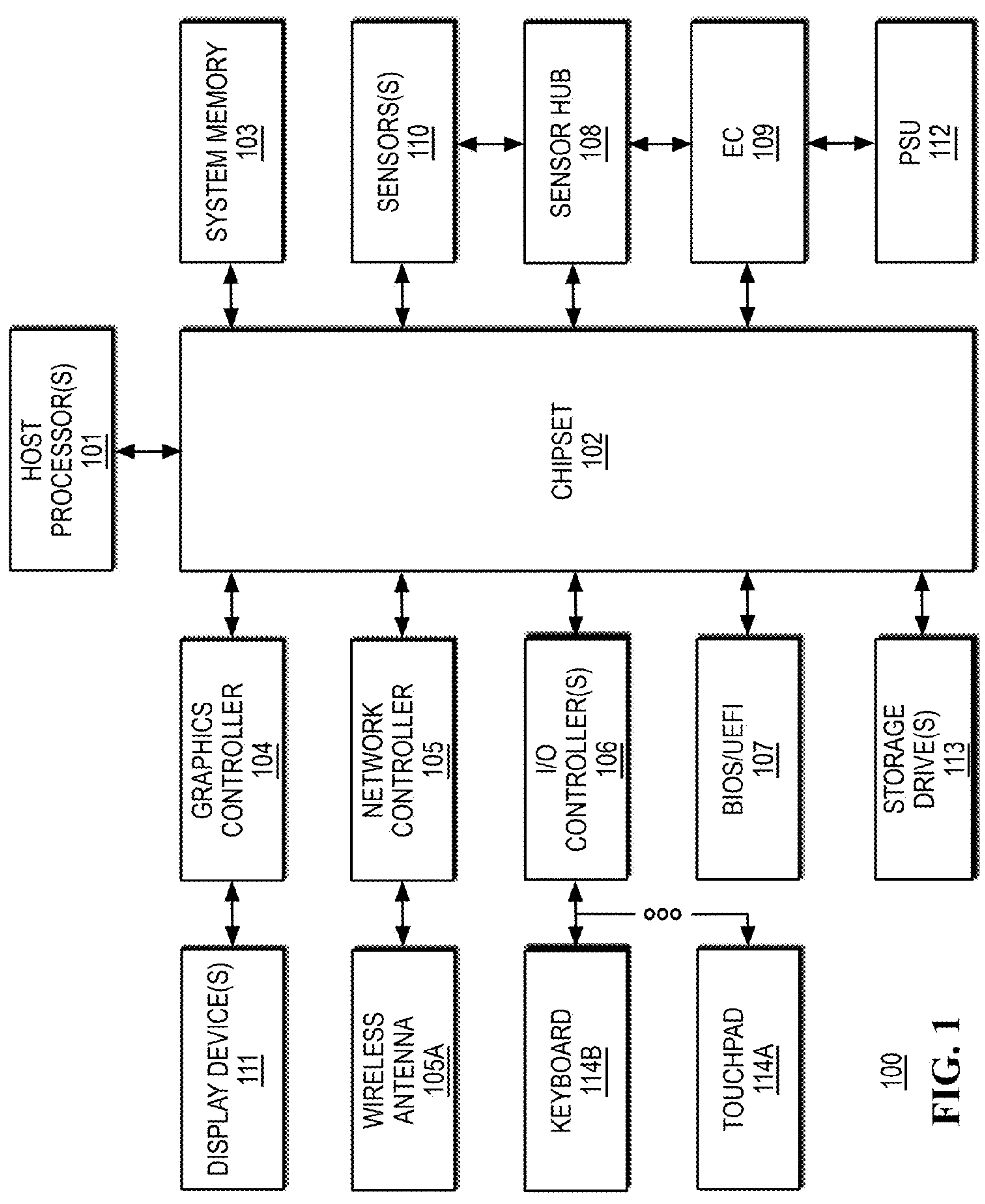
FIG. 1 is a diagram illustrating examples of components of an Information Handling System (IHS) configured, according to some embodiments, for content filtering by the IHS.

FIG. 1 is a diagram illustrating examples of components of an Information Handling System (IHS) 100 configured, according to some embodiments, to support content filtering by the IHS. In some embodiments, IHS 100 may be a laptop computer or a desktop computer that may operate various software applications by which the user of the IHS may view and/or hear various forms of multimedia content. For instance, a user of IHS 100 may view videos, view images, hear audio and read text, in some instances all simultaneously in one multimedia application, such as in a web browser session or other multimedia player. As described, this may subject the user of the IHS to content that may be offensive, unsuitable or otherwise not wanted by certain IHS users. Preventing users from being subjected to such content best serves the user. Embodiments provide such protections while minimizing the potentially unwanted content the user hears or sees and while supporting continued operation of the IHS 100 by the user.

Accordingly, in embodiments, an IHS 100 supports content filtering in a manner that identifies suspected content and filters the unwanted content from the multimedia output that is provided to the user via the I/O capabilities of the IHS. In some embodiments, an IHS 100 may support a virtual environment though which content filtering may be applied for all applications operating on an IHS. In some embodiments, the content filtering may operate as operating system function of the IHS, and may be useable in one or more of the user applications that are supported by the operating system, such as web browsers and other multimedia players.

As illustrated, IHS 100 includes host processor(s) 101. In various embodiments, IHS 100 may be a single-processor system, a multi-processor system including two or more processors and/or processor cores. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.). IHS 100 utilizes a chipset 102 that may include one or more integrated circuits that are connected to processor 101. In the embodiment of FIG. 1, processor 101 is depicted as separate component from chipset 102. In other embodiments, all of chipset 102, or portions of chipset 102 may be implemented directly within the integrated circuitry of the processor 101. Chipset 102 provides the processor(s) 101 with access to a variety of resources of the IHS.

In some embodiments, processor 101 may include an integrated memory controller that may be implemented directly within the circuitry of the processor 101, or the memory controller may be a separate integrated circuit that is located on the same die as the processor 101. The memory controller may be configured to manage the transfer of data to and from the system memory 103 of the IHS 100 via a high-speed memory interface. The system memory 103 provides the processor 101 with a high-speed memory that may be used in the execution of computer program instructions by the processor 101. Accordingly, system memory 103 may include memory components, such as such as static RAM (SRAM), dynamic RAM (DRAM), NAND Flash memory, suitable for supporting high-speed memory operations by the processor 101. In certain embodiments, system memory 103 may combine both persistent, non-volatile memory and volatile memory. In certain embodiments, the system memory 103 may be comprised of multiple removable memory modules.

As illustrated, a variety of resources may be coupled to the processor(s) 101 of the IHS 100 through the chipset 102. For instance, chipset 102 may be coupled to a wireless network controller 105 that may support different types of wireless network connectivity. In certain embodiments, wireless network controller 105 may include one or more Network Interface Controllers (NICs). In some embodiments, wireless network controller 105 may implement hardware for communicating via a specific networking technology, such as Wi-Fi, BLUETOOTH, and mobile cellular networks (e.g., CDMA, TDMA, LTE). In some embodiments, network controller 105 may support wireless Wi-Fi communications, and my include a Wi-Fi controller or wireless NIC card by which IHS 100 transmits and receives wireless Wi-Fi signals.

In some embodiments, the wireless signaling utilized by wireless network controller 105 may be implemented using multiple wireless antenna 105*a*. In transmitting and receiving wireless signals using multiple antenna 105*a*, the strength of signals that are received by each of these antenna 105*a* may be analyzed to provide directional information regarding the environment in which the wireless signals are propagated. In some embodiments, the directional information that is used in the transmission and reception of wireless signals from each of the antenna 105*a* may be used to detect the presence of the user of the IHS 100 relative to the position of the IHS itself.

Returning to the hardware and software of an IHS according to embodiments, chipset 102 also provides processor 101 with access to one or more storage drives 113. In various embodiments, storage drives 113 may be integral to the IHS, or may be external to the IHS 100. In some embodiments, storage drive(s) 113 may be accessed via a storage controller that may be an integrated component of the storage device. In some embodiments, a storage controller may be a system-on-chip function of processor(s) 101. Storage drive(s) 113 may be implemented using any memory technology allowing IHS 100 to store and retrieve data. For instance, storage drive(s) 113 may be a magnetic hard disk storage drive or a solid-state storage drive. In certain embodiments, storage drive(s) 113 may include a system of storage devices, such as a cloud drive accessible via network interface 105.

As illustrated, IHS 100 also includes a BIOS (Basic Input/Output System) 107 that may be stored in a non-volatile memory accessible by chipset 102. In some embodiments, BIOS 107 may be implemented using a dedicated microcontroller coupled to the motherboard of IHS 100. In some embodiments, BIOS 107 may be implemented as operations of embedded controller 109. Upon powering or restarting IHS 100, processor(s) 101 may utilize BIOS 107 instructions to initialize and test hardware components coupled to the IHS 100. The BIOS 107 instructions may also load an operating system for use by the IHS 100. The BIOS 107 provides an abstraction layer that allows the operating system to interface with certain hardware components of the IHS 100. The Unified Extensible Firmware Interface (UEFI) was designed as a successor to BIOS. As a result, many IHSs utilize UEFI in addition to or instead of a BIOS. As used herein, BIOS is intended to also encompass UEFI.

As described, one or more display devices 111 may be coupled to IHS 100. Display device(s) 111 may include a plurality of pixels that are arranged in a matrix and are configured to display visual information. Display device(s) 111 may include Liquid Crystal Display (LCD), Light Emitting Diode (LED), organic LED (OLED), or other thin film display technologies. IHS 100 may support an integrated display device, such as a display integrated into a laptop, tablet, 2-in-1 convertible device, or mobile device. In some embodiments, IHS 100 may be a hybrid laptop computer that includes dual integrated displays incorporated in both of the laptop panels. IHS 100 may also support use of one or more external displays, such as external monitors that may be coupled to IHS 100 via various types of couplings. External displays that are supported by IHS 100 may also include a projection display. The external displays of an IHS 100 may also include wearable displays, such as displays integrated within VR headsets.

In some embodiments, one or more of the display devices 111 may be capable of receiving touch inputs from a user. In some embodiments, these touch inputs received via display devices 111 may be processed by a touch controller that may be separate from other controllers used the display of content. In some embodiments, the touch controller functions may be implemented by a display controller. In some embodiments, touch controller may be an embedded component of an individual display device 111, such that IHS 100 may support multiple distinct touch controllers, each processing inputs from a separate display device 111, such as integrated touch controllers processing inputs from separate display panels of a laptop IHS.

In some embodiments, chipset 102 may operate the one or more display device(s) 111 via a graphics processor and/or GPU (Graphics Processor Unit) 104. In certain embodiments, a graphics processor 104 may be comprised within a video or graphics card or within an embedded controller installed within IHS 100. In certain embodiments, a graphics processor 104 may be integrated within processor 101, such as a component of a system-on-chip. In some embodiments, the content filtering described herein may interoperate with graphics processor 104 in the redacting images and video, such as through replacing specific images or frames of video, or portions of these images/frames, with blank or color-coded content.

Chipset 102 may also provide access to one or more user input devices, in some instances using one or more I/O controller(s) 106 or the like. Examples of user input devices include, but are not limited to a touchpad (such as a touchpad integrated in the palm rest area of a laptop IHS), keyboard 114B and mouse 114C. In some embodiments, a single controller may support multiple of these user input devices, such as a keyboard controller that detects inputs from the keyboard 114B and also detects inputs from a touchpad 114 integrated in the palm rest, and also detects mouse 114C inputs detected by buttons included on or under a palm rest of an laptop IHS 100. In some embodiments, other user input devices supported through the operation of I/O controller(s) 106 may include a stylus, microphone(s) and camera(s) that may each be integrated or external components of an IHS 100.

Some IHS 100 embodiments may utilize an embedded controller 109 that may be a motherboard component of IHS 100 and may include one or more logic units. In certain embodiments, embedded controller 109 may operate from a separate power plane from the main processors 101 of IHS, and thus from the operating system functions of IHS 100. In some embodiments, firmware instructions utilized by embedded controller 109 may be used to operate a secure execution environment that may include operations for providing various core functions of IHS 100, such as power management and management of certain operating modes of IHS.

For instance, embedded controller 109 may implement operations for interfacing with a power supply unit (PSU) 112 in managing power for IHS 100. In certain instances, the operations of embedded controller may determine the power status of IHS 100, such as whether IHS 100 is operating strictly from battery power, whether any charging inputs are being received by power supply unit 112, and/or the appropriate mode for charging the one or more battery cells of the IHS using the available charging inputs. Embedded controller 109 may support routing and use of power inputs received via a USB port and/or via a power port supported by the power supply unit 112. In addition, operations of embedded controller 109 may interoperate with power supply unit 112 in order to provide battery status information, such as the state of charge of the battery.

In some embodiments, embedded controller 109 may also implement operations for detecting certain changes to the physical configuration of IHS 100 and managing the modes corresponding to different physical configurations of IHS 100. For instance, where IHS 100 is a laptop computer or a convertible laptop computer, embedded controller 109 may receive inputs from a lid position sensor that may detect whether the two sides of the laptop have been latched together, such that the IHS is in a closed position. In response to lid position sensor detecting latching of the lid of IHS 100, embedded controller 109 may initiate operations for shutting down IHS 100 or placing IHS in a low-power mode. In this manner, IHS 100 may support the use of various power modes.

In managing the operation of IHS 100 according to its physical posture, embedded controller 109 may identify any number of IHS physical postures, including, but not limited to: laptop, stand, tablet, or book postures. For example, when an integrated display 111 of IHS 100 is open with respect to a horizontal, face-up position of an integrated keyboard, EC 109 may determine IHS 100 to be in a laptop posture. When an integrated display 111 of IHS 100 is open with respect to a horizontal keyboard portion, but the keyboard is facing down (e.g., its keys are against the top surface of a table), EC 109 may determine IHS 100 to be in a kickstand posture. When the back of an integrated display 111 is closed against the back of the keyboard portion of an IHS, EC 109 may determine IHS 100 to be folded in a tablet posture. When IHS 100 has two integrated displays 111 that are open side-by-side (e.g., in a hybrid laptop with displays in both panels), EC 109 may determine an IHS 100 to be in a book posture. When an IHS 100 is determined to be in a book posture, EC 109 may also determine if the display(s) 111 of IHS 100 are arranged in a landscape or portrait orientation, relative to the user.

IHS 100 may include a wide variety of sensors 110 for use in gathering telemetry data that can be used in the management of operations by the IHS, and in embodiments, for describing the context of the IHS's 100 current operations, where this context information may be used in the selection and/or adjustments of the color definitions to be used for the display of content. Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s). Sensors 110 may include geo-location sensors capable for providing a geographic location for IHS 100, such as a GPS sensor or other location sensors configured to determine the location of IHS 100 based on triangulation and network information. Various sensors, such as optical, infrared and sonar sensors, may be used in the detection of individuals in proximity to the IHS 100 and/or in other forms of user presence detection. In some embodiments, user presence detection may be provided using a combination of sensor 110 information and using wireless signal information and collected by network controller 105.

In some embodiments, sensor hub 108 may utilize data from inertial movement sensors, that may include accelerometer, gyroscope, and magnetometer sensors, to determine the current orientation and any movement of IHS 100 (e.g., IHS 100 is motionless on a relatively flat surface, IHS 100 is being moved irregularly and is likely in transport, the hinge of IHS 100 is oriented in a vertical direction). In certain embodiments, the sensor hub 108 may also include capabilities for determining a location and movement of IHS 100 based on triangulation of network signal and based on network information provided by the OS or by a network interface.

In some embodiments, an IHS 100 may not include all of the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as systems-on-a-chip.

Figure 2:
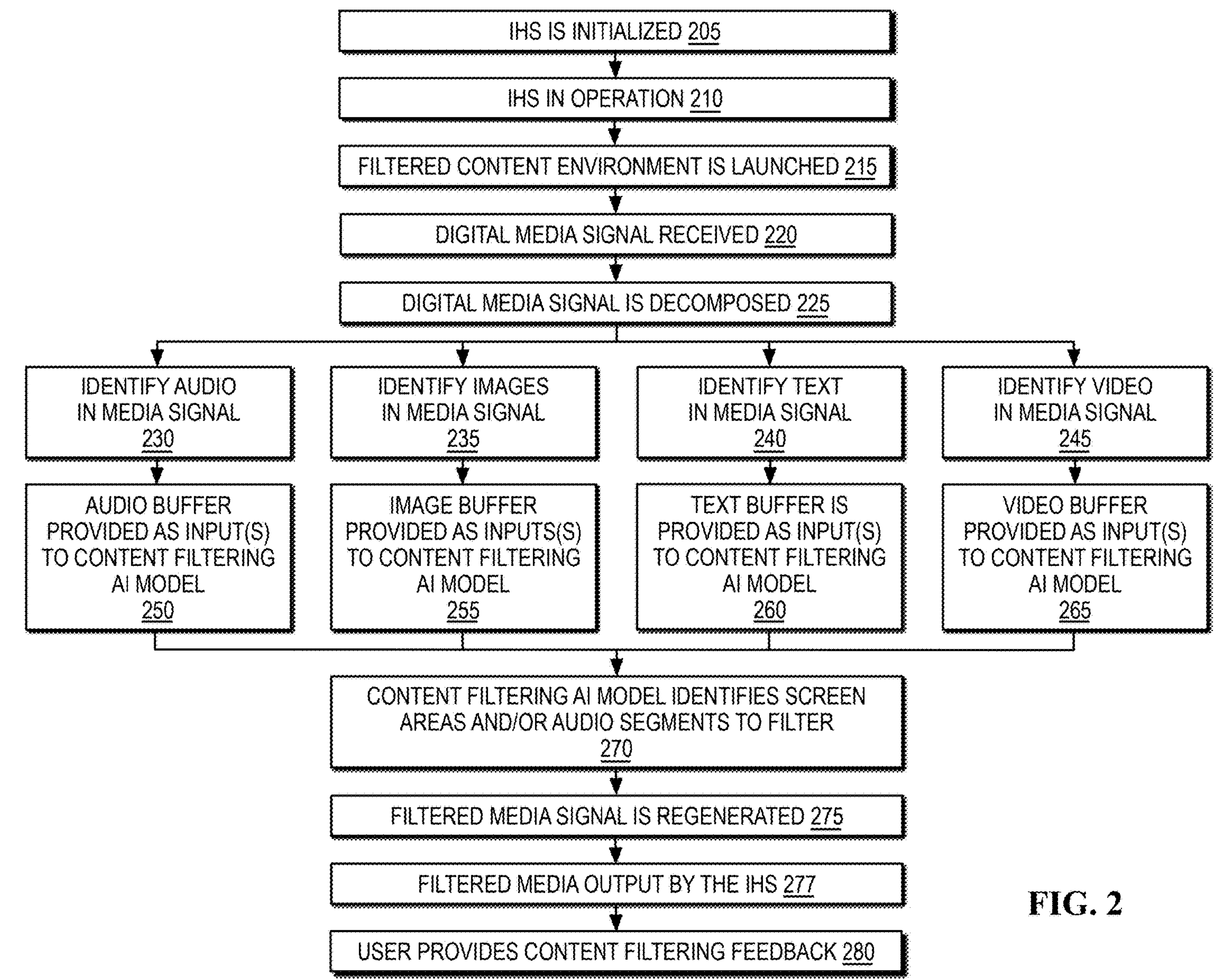
FIG. 2 is a flowchart illustrating an example of a method, according to some embodiments, for content filtering by an IHS.

FIG. 2 is a flowchart illustrating an example of a method, according to some embodiments, for content filtering by an IHS 100. Embodiments may begin, at 205, with the initialization of an IHS 100, such as upon booting or restarting the IHS. In some embodiments, upon initialization of an IHS, instructions to be loaded for use by hardware components of the IHS, such as firmware and other settings, may be validated as authentic based on comparisons of the instructions to be loaded against reference signatures corresponding to authentic instructions. Upon successful validation of such instructions, one or more of the hardware components of the IHS 100 may load validated instructions and may thus operate based on execution of these trusted instructions.

In some embodiments, this validated firmware to be loaded by components of the IHS 100 may include firmware for use in operating aspects of a content filtering virtual environment. As described above, in some embodiments, such validated firmware may be utilized in the operation of the content filtering virtual environment, such as filtering capabilities that may be implemented based on validated firmware operations of a graphics controller 104 of the IHS. In some embodiments, such validated firmware instructions may be adapted to interoperate with an virtual environment that runs on IHS 100 and that includes applications for content filtering.

Once firmware instructions have been validated, further initialization may include initiating the IHS 100 boot sequence and loading operating system instructions. Once a requisite amount of instructions have been loaded the IHS may boot an operating system and, at 210, the IHS may be operated by the user. The IHS may be operated for any amount of time by the user until, at 215, a virtual environment may be launched for content filtering in multimedia outputs by the IHS. In some instances, the virtual environment may be launched in response to the user of the IHS 100 initiating the virtual environment. In some instances, the virtual environment may be launched automatically, such as upon booting of the operating system, or such as upon the user selecting a filetype that has been designated for operation by the virtual environment, or by an application that operates within the virtual environment, or by accessing a remote resource (e.g., a URL) for which access is provided via the virtual environment.

In some embodiments, the content filtering environment may be operated in part by an embedded controller 109 of the IHS, where the embedded controller may interface with the operating system of the IHS and also with graphics controller 104 in filtering content to be displayed by a display device 111 of the IHS. For instance, the embedded controller 109 may interface with the graphics controller 104 in filtering, such as blurring, concealing or removing, images or frames that has been deemed unwanted, suspicious or otherwise subject to filtering, where such determinations of the content to be filtered may be determined by a content filtering AI model that is described with regard to FIG. 3.

In some embodiments, the content filtering environment may be a virtual environment that operates in a segregated environment of the IHS. In some embodiments, the content filtering environment may operate as a virtual machine, workspace or the like, that operates using segregated portions of the IHS file system, and in some embodiments using segregated portions of system memory 103, thus logically isolating the content filtering environment from other applications operating in the operating system, or elsewhere, on the IHS.

The content filtering environment may support a variety of multimedia applications that, at 220, may receive a digital signal that may include one or more forms of media. The applications of the content filtering environment supporting the content filtering described herein may include a variety of applications used for viewing various combinations of video, text, images, audio, etc. In some embodiments, rather than utilize a content filtering virtual environment, applications that support content filtering may instead operate as applications of the operating system.

Upon an application supporting content filtering detecting a multimedia signal, at 225, the signal may be decomposed into different types of media that are included in the signal. Some digital multimedia signals may include layered data, with different layers being usable to encode different types of information, such as audio, video and text layers. Some digital multimedia signals may similarly utilize different channels of data, with separate channels for audio and video. Some digital multimedia signals may utilize structured data to designate the different content that is included in the signal, such as embedding different media forms within a web page through the use of structured data supported by the web browser.

As indicated in FIG. 2, once the multimedia signal has been decomposed, separate forms of content are analyzed separately, and to varying degrees also in parallel, to identify content that should be filtered from the signal. As indicated, at 230, audio is one form of content that may be isolated from the multimedia signal. Audio may be present simultaneously in the multimedia signal in multiple forms. Accordingly, each audio stream that is identified in the multimedia signal may be separately evaluated for unwanted content to be filtered. For each audio stream that is identified, embodiments may initiate filtering of the audio for content that satisfies filtering criteria for identifying unwanted audio, such as filtering out offensive words or sounds.

Figure 3:
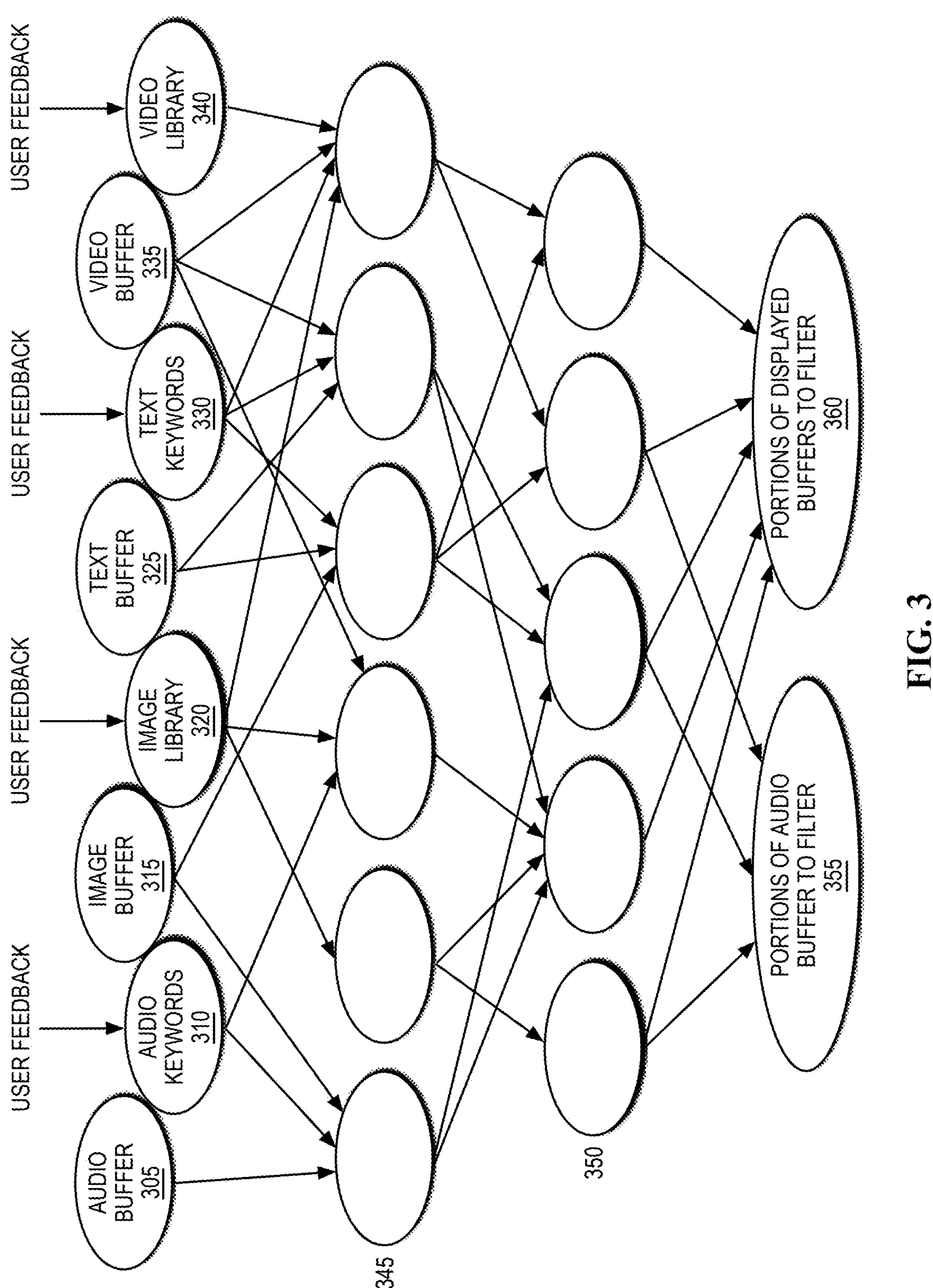
FIG. 3 is a diagram illustrating certain aspects of a content filtering AI model, according to some embodiments, for content filtering by an IHS.

In some embodiments, each audio stream may be buffered, at 250, and provided as an input to a content filtering model, such as described with regard to FIG. 3. As described in additional detail below, the size and timing of the buffering used as audio inputs at each iteration of the content filtering model may be selected in order to improve the content filtering abilities of the model. Through the filtering of an audio stream, the content filtering model may select one or more segments included in each buffer for filtering, where audio filtering may include replacing the filtered segments of the audio buffer with no audio or with a tone or other noise.

In some embodiments, different categories and/or different streams filtered audio may be filtered differently, such as to utilize different tones for filtering different audio streams, and such as to use one replacement tone for words that have bene positively identified and categorized as offensive, and another replacement tone for other noises that are to be filtered (e.g., screaming, crying, etc.), and another replacement tone for words that are not positively identified as unwanted, but are deemed suspicious and being filtered on that basis.

As indicated in FIG. 2, at 235, images are another form of content that may be isolated from the multimedia signal. Similar to audio, multiple images may be present simultaneously in the multimedia signal in multiple forms. For instance, multiple images may be simultaneously displayed via a web page or via most multimedia viewers. Images may be positioned at specific locations within a user interface such that some embodiments may consider each image location that is currently visible in the user interface a separate image stream. Accordingly, each image stream that is identified in the multimedia signal may be separately evaluated for unwanted content to be filtered. For each image stream that is identified, embodiments may initiate filtering of the image for content that satisfies filtering criteria for identifying unwanted images, such as filtering out obscene images or violent images.

In some embodiments, each image stream may be buffered, at 255, and provided as an input to a content filtering model, such as described with regard to FIG. 3. As described in additional detail below, the size and timing of the buffering used as image inputs at each iteration of the content filtering model may be selected in order to improve the content filtering abilities of the model. Through the filtering of an image stream, the content filtering model may select one or more images included in each buffer for filtering, where image filtering may include replacing the filtered all or portions of the image with a preselected shape or image, or blurring the filtered content, or removing the image entirely from the digital signal.

As indicated in FIG. 2, at 240, text may also be isolated from the multimedia signal. Similar to audio and images, multiple distinct portions of text may be present simultaneously in the multimedia signal. For instance, multiple distinct portions of text may be simultaneously displayed via a web page. In another example, distinct portions of text may be superimposed over an image or video. In some embodiments, each distinct block of text that is identified as visible in the multimedia signal may be separately evaluated for unwanted content to be filtered. For each distinct portion of text that is identified, embodiments may initiate filtering of the text for content that satisfies filtering criteria for identifying unwanted text, such as filtering out profanity or other vulgar words, or such as filtering out specific subjects (e.g., for avoid exposure to unwanted information related to movies, shows, events, sports, etc., in order to avoid spoilers).

In some embodiments, the distinct portions of visible text may be buffered, at 260, and provided as an input to a content filtering model, such as described with regard to FIG. 3. As described in additional detail below, the size and number portions of text that are buffered and used as inputs at each iteration of the content filtering model may be selected in order to improve the content filtering abilities of the model. In filtering portions of text, the content filtering model may select one or more words, groups of words or any other collection of words for filtering, where text filtering may include redacting the filtered text with a preselected shape and/or color, or blurring the filtered words, or removing the words entirely from the text that will be displayed in the digital signal.

As indicated in FIG. 2, at 245, video is a fourth type of content that may be isolated from the multimedia signal. Video may be present simultaneously in the multimedia signal in multiple forms, or in multiple distinct instances, such as an IHS 100 display showing multiple live camera feeds in separate user interface windows. Accordingly, each video stream that is identified in the multimedia signal may be separately evaluated for unwanted content to be filtered. For each video stream that is identified, embodiments may initiate filtering of the video for content that satisfies filtering criteria for identifying unwanted video, such as filtering out violent or explicit content.

In some embodiments, each video stream may be buffered, at 265, and provided as an input to a content filtering model, such as described with regard to FIG. 3. As described in additional detail below, the size and timing of the buffering used as video inputs at each iteration of the content filtering model may be selected in order to improve the content filtering abilities of the model. In filtering of an video stream, the content filtering model may select one or more segments included in each buffer for filtering, where video filtering may include replacing the filtered segments, and/or individual frames, of the video buffer with a blank video segment or may include blurring the video for these segments. Some embodiments may also identify specific portions of each video frame to filter, whether by blurring or otherwise obscuring portions of each frame.

As reflected in FIG. 2, each of the decomposed forms of content in the multimedia signal may be buffered and provided separately as inputs to the content filtering model, described in greater detail below. Based on the buffered forms of content provided as inputs, at 270, the content filtering model identifies the unwanted text, images, video and/or text to be filtered, such as in the form of audio segments from each buffer that are filtered, or in the form of screen areas that are blurred, or in the form of redacted text. Once filtered, some embodiments may buffer the filtered content in output buffers for each form of content.

From these output buffers, at 275, embodiments may regenerate the multimedia signal, now with some content filtered from the signal, and, at 277, the filtered media is output to the user of the IHS 100 via a multimedia application. As described above, graphics controller 104 may interoperate with the content filtering to render the visible text, images and video of the filtered data signal, and may interface with an audio controller of the IHS in playback of the filtered audio. Embodiments may regenerate the multimedia signal through synchronization of output buffers with the decomposition of the original multimedia signal into the different input buffers. In some embodiments, the inputs to the content filtering model may remain synchronized. For instance, both an image and text that is supposed to be superimposed over that image are provided as inputs to the content filtering model at the same time. However, some embodiments may determine that a specific form of content, such as text, in the multimedia signal is a leading indicator of content to be filtered in other content. Accordingly, embodiments may desynchronize the different streams of content such that text is evaluated out of sequence with the other content of the multimedia signal.

In response to the displayed and audible filtered output by the multimedia application, at 280, the user of the IHS 100 may provide feedback regarding the filtered content. In some embodiments, the described content filtering virtual environment may provide user interface options by which the user of the IHS 100 may confirm or reject individual instances of filtering in the regenerated multimedia signal. In some embodiments, such user interface capabilities that allow a user to confirm or reject instances of filtering may be provided by the multimedia application by which the regenerated multimedia signal is being output to the user.

Through such feedback, embodiments may adjust the content filtering model, and in particular may adjust the inputs to input nodes of a neural network used to implement the content filtering model, whereby these adjustments modify the filtering for specific types of unwanted content by the model. FIG. 3 is a diagram illustrating certain aspects of a content filtering AI model, according to some embodiments, for content filtering by an IHS. In some embodiments, the content filtering model may be a neural network that receives each of the forms of content that have been decomposed from the digital multimedia signal as inputs to input nodes 305, 315, 325, 335.

Also as illustrated in FIG. 3, input nodes 310, 320, 330, 340 may also receive libraries of exemplar unwanted content to be filtered if these examples are encountered in the content, with the neural network making inferential decisions on whether to filter other content based on its similarity to unwanted content from one of the libraries. In this manner, modifications to these libraries serve to modify the content filtering behavior of the model. Also as indicated in FIG. 3, user feedback may modify the libraries of input nodes 310, 320, 330, 340. In various embodiments, inputs by a user of the IHS 100 may result in modifications to one or more of the libraries currently in use by the content filtering model, where the user inputs may reject or affirm an instance of contenting filtering. Embodiment may also support detection and incorporation of implied feedback into the content filtering model, where ethe implied feedback is based on the user's responses to non-filtered content.

In some embodiments, user feedback may be used to make modifications to an audio keyword library of input node 310. For instance, upon hearing filtered audio content, such as with one or more words or sounds being filtered, a user may operate a user interface option to discontinue filtering of some of the filtered audio content. For instance, in an audio filtered output by the content filtering model that replaces filtered words with a first audio tone or sound and replaces filtered sounds with a second audio tone or sound, embodiments may support user feedback directing that one or both of these types of audio filtering being discontinued, at least temporarily. For instance, in an audio filtered output that replaces detected words with a first audio tone and suspicious words with a second audio tone, embodiments may support user feedback selecting discontinuing use of the second tone in audio filtering, and thus discontinuing the filtering of suspicious words. In response to such user feedback, embodiments may remove suspicious words from the keyword library utilized by input node 310.

In some embodiments, the user feedback used to modify the audio keyword library may be inferred based on the user's response to non-filtered audio. For instance, the I/O capabilities of IHS 100 may be instrumented to detect certain I/O operations that may indicate the user does not want to hear certain sounds. For instance, embodiments may monitor for the user muting or lowering audio volumes and may seek to correlate such instances with the occurrences of specific words or sounds in the non-filtered audio. Upon identifying such correlations, the identified words or sounds are added to the unwanted keyword library utilized by input node 310, and thus incorporated into subsequent content filtering iterations by the content filtering model.

In a similar manner, embodiments may support user feedback used to make modifications to an image library of input node 320. For instance, upon seeing filtered images, such as a web page with images that are fully or partially obscured, a user may operate a user interface option to discontinue filtering of some or all of the filtered images. For instance, a user may select an individual filtered image and may thus directing filtering for this image and similar images to be discontinued, at least temporarily. In a filtered output that filters certain types of image content, such as violence, using a first color and filters other types of image content, such as explicit images, with a second color, embodiments may support user feedback selecting discontinuing use of the second color, and thus discontinuing the filtering of explicit images. In another scenario, in a filtered output that filters out image content that includes a specific logo or other symbol (e.g., the logo of sports team, sports league, gaming franchise), different colors may be used for each different logo that is filtered, with the color selected to correlate to a color used in the logo that is being filtered. Embodiments thus support a user selecting a certain color of redacted images to discontinue the filtering of a particular image, this disabling of filtering used to prevent spoilers. In response to such user feedback, embodiments may remove some images from the image library utilized by input node 320.

In some embodiments, the user feedback used to modify the image library may be inferred based on the user's response non-filtered images. For instance, the I/O capabilities of IHS 100 may be instrumented to detect certain I/O operations that may indicate the user does not want to see certain images. For instance, embodiments may monitor for the user rapidly scrolling using the mouse or keyboard and may seek to correlate such instances with the occurrences of specific non-filtered images. Upon identifying such correlations, the identified images are added to the unwanted image library utilized by input node 330, and thus incorporated into subsequent content filtering iterations by the content filtering model. In this manner, spoiler alerts may be generated through inferring that display of certain image content is unwanted by the user.

In some embodiments, user feedback may be additionally used to make modifications to a text keyword library of input node 330. For instance, upon seeing filtered text, such as seeing redacted words, a user may operate a user interface option to discontinue filtering of some of the filtered text. For instance, in filtered output by the content filtering model that replaces certain types of detected words (e.g., profanity) with a redaction of a first color and replaces other types of words (e.g., information about a movie, series or event) with a redaction of a second color, embodiments may support user feedback directing that one or both of these types of text filtering being discontinued, at least temporarily, such as by user feedback selecting discontinuing use of the second color of text filtering, and thus discontinue filtering of specific words, such as related to spoilers. In response to such user feedback, embodiments may remove certain words from the unwanted text keyword library utilized by input node 330.

In some embodiments, the user feedback used to modify the audio keyword library may be inferred based on the user's response to non-filtered text. For instance, the I/O capabilities of IHS 100 may be instrumented to detect certain I/O operations that may indicate the user does not want to see certain text. For instance, embodiments may monitor for the user for the user rapidly scrolling using the mouse or keyboard, or closing or minimizing the multimedia application, and may seek to correlate such instances with the occurrences of specific text. Upon identifying such correlations, the identified text may be added to the unwanted text library utilized by input node 330, and thus incorporated into subsequent content filtering iterations by the content filtering model.

In a similar manner, embodiments may support user feedback in making modifications to a video library of input node 340. For instance, upon seeing filtered video, such as a web page with video that is fully or partially obscured, a user may operate a user interface option to discontinue filtering of some or all of the filtered video. For instance, a user may select an individual filtered video feed and may thus direct filtering for this video, and similar videos, to be discontinued, at least temporarily. In response to such user feedback, embodiments may remove some videos from the video library utilized by input node 340.

In some embodiments, the user feedback used to modify the video library may be inferred based on the user's response to non-filtered video. For instance, the I/O capabilities of IHS 100 may be instrumented to detect I/O operations that may indicate the user does not want to see certain video. For instance, embodiments may monitor for the user rapidly scrolling using the mouse or keyboard and may seek to correlate such instances with the occurrences of specific non-filtered video. Upon identifying such correlations, frames of the identified videos are added to the unwanted video library utilized by input node 340, and thus incorporated into subsequent content filtering iterations by the content filtering model.

As indicated in FIG. 3, in addition to the library input nodes 310, 320, 330, 340, separate input nodes 305, 315, 325, 335 may receive inputs from one of the streams of content from the decomposed multimedia signal. For instance, the audio input node 305 may receive an input that is an audio buffer containing a segment of audio that has been isolated from the multimedia signal. In some embodiments, the contents of the audio buffer may be evaluated to distinguish and identify any words. In such embodiments, the contents of the audio buffer may first be input to a speech recognition and/or natural language processing service that may be operated by the IHS 100, or that may be provided by a remote service.

Through such evaluation of the audio buffer, individual words, phrases, sentences or other speech may be extracted from the buffer and may be provided as inputs to the content filtering model. Whereas a single input audio node 305 is illustrated, embodiments may utilize any number of input audio nodes, such as audio input nodes for different sized blocks of speech that are identified in the audio input buffer. In some embodiments, additional, separate audio input nodes and library input nodes may be utilized for controlling the filtering of sounds, such as screaming or crying.

Similarly, an image input node 315 may receive inputs that include an image buffer containing or more images that have been isolated from the multimedia signal. In some embodiments, the images may be classified according categories by which images may be filtered from the multimedia signal, such as classification of images as explicit, depicting violence, sports logos, video game franchise, political ads, etc. In such embodiments, the images of the image buffer may first be input to an image classification engine that may be operated by the IHS 100, or that may be provided by a remote service. In such embodiments, images in the image buffer may be provided as inputs along with such classifications, with the content filtering model determining to filter some or all of each image that is input. Whereas a single input image node 315 is illustrated, embodiments may utilize any number of input image nodes, such as image input nodes for different types of image classifications.

In a similar manner, a text input node 325 may receive inputs that include a text buffer containing one or more distinct portions of text that have been isolated from the multimedia signal. Whereas a single input text node 325 is illustrated, embodiments may utilize any number of input text nodes, such as separate input text nodes for individual words, phrases, paragraphs and for larger blocks of text. Through operations of the content filtering model, embodiments may identify portions of text to be redacted or otherwise obscured, with the keyword library 330 providing exemplars of text to be filtered, and the content filtering model making inferences regarding whether to filter text that is not present in the unwanted keyword library.

In some embodiments, the confidence of the content filtering model in determining whether to filter a portion of text may be reflected in the color used in the redaction for that text, such that high confidence identification of text to be filtered is reflected through use of a color from one end of a color scale for redactions of that text, and low confidence identifications of text, such as identification of suspected vulgarities, are reflected through use of a color for redactions from the other end of the color scale. In this manner, the user can evaluate which, if any, of the filtered text portions to view, while allowing the user to discontinue filtering of redacted text with the lowest likelihood of being unwanted by the user. In this same manner, filtering of different forms of content may rely on color-coded selections for redactions that are commensurate with the content filtering model's confidence in the determination to filter the content. Feedback from the user may thus be used in embodiments to tailor the filtering by the content filtering model, while allowing adjustments to first expose the user to the content that is least likely to be unwanted.

Returning to FIG. 3, the content filtering model may also include a video input node 335 that may receive a video buffer containing a segment of video that has been isolated from the multimedia signal. In some embodiments, frames captured from the video buffer may be evaluated in the same manner as isolated images, such as according to categories by which captured video frames may be classified as images that are explicit, violent, logos, movie trailers, sports results, advertisements, etc. As with classification of images, individual frames from the video buffer may first be input to an image classification service. In evaluation of the video buffer, embodiments may sample frames from the video and provide these frames as inputs to the content filtering model. Whereas a single input video node 335 is illustrated, embodiments may utilize any number of input video nodes, such as different video input nodes for different types of video classifications.

In this manner, inputs from each of the buffered forms of content that have been decomposed and isolated from the input multimedia signal may be used as inputs to individual nodes of an input layer of the neural network. In some embodiments, the different content buffers being used my remain synchronized such that content from the same point in the multimedia signal are input together to the content filtering model. For instance, text that is to be superimposed over video that includes audio is evaluated by the content filtering model with that text, video and audio all provided as inputs in the same iteration of the content filtering model. However, some embodiments may identify a particular form or content, or a particular content stream, as a leading indicator of content to be filtered throughout the different forms of content included in multimedia signal. For instance, feedback training of the content filtering model may identify the text overlay of the multimedia signal as a leading indicator and may evaluate that content out of synchronization such that text from a particular point in the video is input in a prior iteration of the content filtering model relative to the other content from that point in the video. In this manner, embodiments may adjust the synchronization of decomposed buffers used as inputs to the content filtering model.

As illustrated in FIG. 3, the input library nodes 310, 320, 330, 340 and the input content nodes 305, 315, 325, 335 may be connected to multiple intermediate layers 345, 350 of nodes. As illustrated, a variety of interconnected pathways may be present between the input layer nodes and the nodes of the intermediate layers 345, 350. However, the illustrated connections of the nodes of the content filtering model are illustrative. Through training of the content filtering model, including the described user feedback mechanisms, the internal structure of intermediate layer 345, 350 nodes and connections may be modified to any supported internal configuration. Accordingly, content filtering model embodiments may utilize any number of intermediate layers and any number of nodes in each of these layers. The described feedback by the user may also alter the internal operations of the content filtering model through modifications to weights associated with each of the node signaling pathways and/or to activation functions used by individual nodes in determining whether to fire based on received inputs, and thus to propagate outgoing signals to connected downstream nodes.

In the illustrated embodiment, the content filtering model generates outputs through two output nodes 355, 360. An audio output node 355 may specify portions of the audio buffer that was used as an input to be filtered. The output may specify a type of filtering to be used in each instance, such as the use of a specific output tone in place of detected profanity and the use of a different tone for sounds, such as screaming. In some embodiments, multiple audio output nodes may be utilized, such as separate output nodes for each different channel of audio that has been isolated from the audio stream of the multimedia signal, or such as separate output nodes generating filtering determinations for verbal content and for sounds. Based on such audio filtering outputs 355, the portions of the audio input buffer are amended to replace filtered segments with a designated sound.

In the illustrated embodiment, a second output node 360 of the content filtering model provides filtering determinations for displayed information, and thus for text, images and/or video to be filtered. Some embodiments may utilize separate outputs for the different forms of visual content that may be filtered, and may thus include a separate text output node, image output node and video output node, where each different type of output node specifies the portions of the respective input buffer to be filtered. Based on the outputs of the content filtering model, one or more of the visual buffers used as inputs may be filtered according to applicable policies.

For instance, text from the input text buffer 315 may be edited based on outputs from the model to redact specific words or groups of words from the text buffer. In this same manner, images from the input image buffer 315 may be removed and replaced with placeholder images that may be selected according to polices (e.g., to reflect the confidence of that particular output by the content filtering model). In some embodiments, the outputs of the content filtering model may specify portions of an image from the input buffer to be filtered, such as by blurring or otherwise obscuring portions of the image. In a similar manner, segments of the video buffer 335 may be filtered based on outputs of the content filtering model, such as to replace individual frames of the video with placeholder images, or to filter certain portions of each frame of the video.

Upon filtering the buffers used as inputs to the content filtering model, the filtered content from these buffers may be used to regenerate the multimedia signal. Embodiments may thus refresh the input buffers of each of the input nodes 305, 315, 325, 335 with decomposed multimedia signal data, and another iteration of the content filtering model is repeated to filter another segment of the multimedia signal. As described, user feedback regarding the content filtering may be applied at each iteration of the content filtering model, where the user feedback may result in changes to the exemplar libraries used as inputs 310, 320, 330, 340, and may also result in modifications to the internal structure of the content filtering model, thus altering the filtering of unwanted content by the model.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A method for content filtering by an Information Handling System (IHS), the method comprising:

receiving a digital media signal;

decomposing the digital media signal to isolate two or more types of content, with one or more streams isolated from the signal for each of the types of content;

inputting, to a content filtering model comprising a neural network, the one or more streams of each type of content as inputs to the neural network;

inputting one or more libraries of exemplar unwanted content, wherein the neural network identifies content to be filtered from the one or more streams of each type of content;

outputting, by the content filtering model, at least one of: displayed portions of the digital media signal and audible portions of the digital media signal, to be filtered; and regenerating the digital media signal from one or more streams of content that have been filtered based on the outputs of the content filtering model.

2. The method of claim 1, further comprising launching a virtual environment comprising a multimedia application for output of the regenerated digital media signal.

3. The method of claim 1, further comprising modifying the one or more libraries of unwanted exemplar content in response to feedback from a user of the IHS.

4. The method of claim 3, wherein the feedback comprises a user interface request by the user to remove an instance of filtered content.

5. The method of claim 1, wherein a first type of content decomposed from the digital media signal comprise audio, and wherein the one more streams of content comprise at least one audio stream.

6. The method of claim 5, wherein the content filtering model outputs one or more segments of the audio stream to be replaced.

7. The method of claim 1, wherein a second type of content decomposed from the digital media signal comprise text, and wherein the one or more streams of content comprise at least one text stream.

8. The method of claim 7, wherein the content filtering model outputs one or more portions of text to be redacted.

9. The method of claim 1, wherein a third type of content decomposed from the digital media signal comprise images, and wherein the one or more streams of content comprise at least one image stream.

10. The method of claim 9, wherein the content filtering model outputs one or more images to be redacted.

11. The method of claim 1, wherein a fourth type of content decomposed from the digital media signal comprise video, and wherein the one or more streams of content comprise at least one video stream.

12. The method of claim 11, wherein the content filtering model outputs one or more frames of the video stream to be redacted.

13. The method of claim 1, wherein the digital media signal is decomposed into a plurality of separate buffers designated for each of the forms of content.

14. The method of claim 13, wherein buffers for one of the types of content are input to the content filtering model unsynchronized with buffers for other types of content decomposed from the digital media signal.

15. The method of claim 14, wherein the unsynchronized type of content is selected on the basis of being a leading indicator of unwanted content of other types to be filtered.

16. An Information Handling System (IHS) comprising:
one or more processors; and
one or more memory devices coupled to the one or more processors, the memory devices storing computer-readable instructions that, upon execution by the one or more processors, cause the first IHS to:
receive a digital media signal;
decompose the digital media signal to isolate two or more types of content, with one or more streams isolated from the signal for each of the types of content;
input, to a content filtering model comprising a neural network, the one or more streams of each type of content as inputs to the neural network;
input one or more libraries of exemplar unwanted content, wherein the neural network identifies content to be filtered from the one or more streams of each type of content;
output, by the content filtering model, at least one of: displayed portions of the digital media signal and audible portions of the digital media signal, to be filtered; and
regenerate the digital media signal from one or more streams of content that have been filtered based on the outputs of the content filtering model.

17. A non-transitory computer-readable storage device having instructions stored thereon for content filtering by a first IHS (Information Handling System), wherein execution of the instructions by one or more processors of the first IHS causes the one or more processors to:
receive a digital media signal;
decompose the digital media signal to isolate two or more types of content, with one or more streams isolated from the signal for each of the types of content;
input, to a content filtering model comprising a neural network, the one or more streams of each type of content as inputs to the neural network;
input one or more libraries of exemplar unwanted content, wherein the neural network identifies content to be filtered from the one or more streams of each type of content;
output, by the content filtering model, at least one of: displayed portions of the digital media signal and audible portions of the digital media signal, to be filtered; and
regenerate the digital media signal from one or more streams of content that have been filtered based on the outputs of the content filtering model.

* * * * *